United States Patent [19]

Anspon

[11] 4,212,789
[45] Jul. 15, 1980

[54] PROCESS FOR PREPARING HIGH IMPACT POLYSTYRENES

[75] Inventor: Harry D. Anspon, Sewickley Borough, Pa.

[73] Assignee: United States Steel Corporation, Pittsburgh, Pa.

[21] Appl. No.: 935,410

[22] Filed: Aug. 21, 1978

[51] Int. Cl.$^2$ .............................................. C08K 5/01
[52] U.S. Cl. ........................... 260/33.6 AQ; 525/258; 525/316
[58] Field of Search ................. 260/880 R, 33.6 AQ; 526/208, 218

[56] References Cited

U.S. PATENT DOCUMENTS

| | | | |
|---|---|---|---|
| 3,214,495 | 10/1965 | Harris | 260/880 R |
| 3,284,542 | 11/1966 | Carrock | 260/880 R |
| 3,428,712 | 2/1969 | Carrock | 260/880 R |
| 3,658,944 | 4/1972 | Osuga | 260/880 R |
| 3,989,771 | 11/1976 | Reith | 260/880 R |

*Primary Examiner*—Paul R. Michl
*Attorney, Agent, or Firm*—William L. Krayer

[57] ABSTRACT

A process is described for preparing high impact polystyrenes by mass-suspension polymerization of styrene and a polybutadiene rubber having a vinyl isomer content of 11 to 22 percent. The high impact polystyrenes made by the disclosed process are useful for forming extruded sheet with balanced impact properties suited for deep draw thermoforming.

5 Claims, No Drawings

PROCESS FOR PREPARING HIGH IMPACT POLYSTYRENES

BACKGROUND OF THE INVENTION

The objective of this invention is to disclose the process variables which are important in formation of a high impact polystyrene useful in making extruded sheet with balanced properties suitable for deep draw thermoforming of packaging containers.

Packaging containers are made of polystyrene because of its ability to be thermoformed readily on automatic machinery. The finished containers exhibit high stiffness even in thin walls because of the stiffness of polystyrene. Such containers are often over-printed, and polystyrene's ready acceptance of printing is useful in this application. These containers must possess good impact strength in order to contain the material between filling and use and to withstand the abuse normally encountered in storage and handling from room temperature to below room temperature. Such containers are often fabricated with a depth of draw at least as great as the diameter of the container or even greater.

A polystyrene resin for this application must possess impact strength in the finished deep drawn container. It is important for such a packaging grade high impact polystyrene that it be capable of producing extruded sheet with balanced impact and elongation properties. The sheet material possessing these balanced properties in transverse and across machine extrusion direction must also thermoform uniformly into deep drawn containers showing good impact resistance with no weakness in flex and impact. The container must resist splitting parallel to the axis of the container.

A high impact polystyrene for this application must also form sheet with sufficient melt strength to be handled readily on automatic thermoforming equipment which heats wide sheet webs and thermoforms the web into a plurality of deep drawn containers. These webs must not unduly sag under heaters and must still be thermoformed readily without tearing of the sheet during hot stretching. Also, it is advantageous to have impact polystyrene resins that with minor changes in the polymerization recipe for the resin can be used for injection molding and extrusion or extrusion alone.

SUMMARY OF THE INVENTION

A process is described for preparation of impact polystyrenes from styrene and a polybutadiene rubber which has a vinyl isomer content in the range of 11 to 22 percent. The impact polystryenes obtained by this process can be extruded into sheet with satisfactory elongation, tensile strength, and impact strength along with melt toughness and chemical resistance. The extruded sheet produced from impact polystyrene made by this process can be fabricated by deep draw thermoforming. The impact polystryene can also be injection molded. The process employs mass polymerization under thermal conditions followed by free radical catalyzed suspension polymerization in the presence of small amounts of very active free radical terminators.

The impact polystyrene resins to which this invention is directed are those in which there is a matrix of polymerized styrene containing a dispersed phase of small insoluble particles. These particles in turn have a matrix of polybutadiene rubber containing another dispersed phase of polymerized styrene. Between the gross matrix of polymerized styrene and the dispersed insoluble particles there are graft copolymer linkages of styrenepolybutadiene; these linkages are relatively few per unit weight of insoluble particles. The individual particle contains crosslinked polybutadiene rubber, styrene homopolymer and graft copolymer linkages between the rubber and the dispersed polystyrene phases. The overall weight ratio of polybutadiene rubber is in the range of about 4 to 10% of the total weight of rubber and styrene.

The impact polystyrene resins made by my process are characterized by a combination of chemical, physical and optical analyses. The chemical properties are molecular weight of the polymerized styrene matrix, the percent insoluble material in the resin (% insolubles), the percent grafting of the styrene (% grafting) and the ratio of swollen insoluble material to dry insoluble material (Swelling Index). Optical analyses may include microphotography to determine the presence of discrete insoluble particles and the average particle size of the particles (Resin Particle Size, RPS). In the resins of this invention, the Swelling Index measured as weight ratio is in the range of 5.0 to 30.0; the resin particle size is in the range of 1-10 microns.

The polymerized styrene matrix will have a number average molecular weight in the range of about 70,000 to 120,000. The percent insolubles, including crosslinked polybutadiene, and graft copolymer between styrene and polybutadiene and occluded polystyrene will be in the range of 10 to 20%. The percentage grafting will be in the range of 10 to 20%.

Chemical resistance is a measure of the effect of vegetable oils or fats on the impact polystyrene resin; it is expressed in terms of minutes before failure of a stressed sample of resin that is coated with hydrogenated vegetable oil. It is intended to predict behavior of the resin when used as a packaging material in contact with food products such as margarine, cottage cheese, mayonnaise or mustard. Resins made by my method have a standard chemical resistance of at least 29 minutes. As the vinyl content of the polybutadiene rubber increases, the resistance of the resins increases to 35-60 minutes.

The physical properties of resin samples are measured by conventional test methods. These are taken to reflect the expected performance of the resin during fabrication and while in service as a molded plastic article. These also are a measure of the effectiveness of the polybutadiene rubber and the dispersed insoluble particles in modifying the properties of the polymerized styrene matrix. The principal resin properties measured are Vicat softening temperature, melt index, elongation at failure, tensile strength at yield, tensile strength at failure or break, and impact toughness in terms of impact strength. For the resins of this invention, the Vicat temperature will be at least 214° F. Melt index is a parameter for injection molding and extrusion performance; extrusion resin grades will have an MI of up to 2.5 gm/10 sec.; grades for either injection or extrusion will have an MI of up to 4.0 gm/10 sec.

The magnitude of values for elongation, tensile strength and impact strength depend in part on the form of resin from which samples are made. As resin is converted from fine beads to extruded pellets and from pellets to extruded sheets, the absolute values change. The sheet forms are also affected by orientation effects on resin molecules from the direction of extrusion. Tensile strength at failure and elongation at failure for the samples from extruded sheets should be in the ranges of at least 2000 psi and at least 35%, respectively. The corresponding Izod impact strength should be at least 0.9 ft. lb./in. The direction of changes in values of elongation at failure and Izod impact strength between bead, pellet and sheet samples should be consistent. Orientation effects as shown by sheet samples from the direction of extrusion and perpendicular to the direction of extrusion should be minimized; the variation in values between samples from the respective directions will be no more than about 30% below the larger value. Especially desirable resins are those in which the difference in values is 20% or less. As can be seen from the description given hereafter, it is possible to achieve a difference of less than 10% for the values of elongation at failure and tensile strength at failure with the difference in Izod values being less than 20%.

The performance of the resins during fabrication is affected by the particular polymerization recipe, conditions for polymerization of the recipe and the processing additives used with the resin. Typical operating conditions for extrusion are melt temperatures of about 400°–500° F., pressures of 1000–2500 psi, sheet gages of about 0.03 to 0.12 inches. The flow characteristics of the resins will be a combination of flow rate and melt viscosity so that the resin flows at an acceptable rate and produces sheet of uniform gage. This is indicated by the melt index and Vicat softening point. A feature of the resins of this invention is that the physical properties of recycled resin are substantially the same for a first, second, third or even fourth or more recycle. An additional feature is that the resins resist thinning when extruded sheet is further subjected to deep draw thermoforming. This means that as the extruded sheet is heated and subjected to forming against a die, the cross-sectional thickness of the molded article is uniform which avoids weakened sidewalls. The combination of isotropic sheet properties, satisfactory performance from recycled (commonly called regrind) resins and deep-draw formability along with other physical properties at least equivalent to conventional impact polystyrene resins is a unique feature of this invention. Another feature is that with minor changes in mercaptan concentration and catalyst concentration in the basic polymerization recipe for extrusion grade resins, resins can be made to have sufficiently high melt flow rates, elongation at yield and impact toughness so that they can be used for both injection molding or extrusion.

The impact polystryene resins of this invention are prepared by dissolving polybutadiene rubber in styrene monomer and conducting a first polymerization under thermal conditions while stirring the mixture of stryene and rubber. The polymerization is then continued until substantial completion. Peroxide catalysts, and an aqueous suspension system are used in the latter phase of polymerization. The polymerization procedure and temperatures are selected to be effective for producing the resins in the presence of polymerization inhibitors present as antioxidants or stabilizers in the various raw materials.

It has been found that the above resins can be made if during the polymerization there are present small amounts, up to 10 ppm, of very active free radical terminators of the quinone and quinone-imine types. During the initial stage of polymerization of the styrene and the polybutadiene, these are effective where the polymerization is conducted under conditions that utilize primarily secondary free radicals rather than primary free radicals. In general the very active quinone and quinone-imine free radical terminators are characterized by the following structures:

quinone alkide

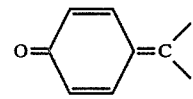

quinone

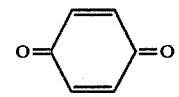

quinone-mono-imine

quinone-diimine

Alkyl or aryl substituted members have deep coloration, usually yellow or yellow/red. The effective concentration of the quinone and quinone-imine compounds is about 0.1–10 ppm by weight of the polybutadiene rubber. While each may be used separately, combinations of the two types are also effective.

The quinone and quinone-imine compounds should desirably be non-volatile under the conditions of polymerization. In any event the effect of the tendency to volatilize or sublime may be obviated by the use of a closed reactor. The quinone compounds may have at least two ketone groups as an integral part of an aromatic ring, e.g., benzoquinone or anthraquinone, or may have at least one aromatic ring which has an integral ketone group and which is further substituted by groups to form a completely conjugated unsaturated system, e.g., stilbene quinone or a quinone alkide. In the case of a bridging unsaturated group between aromatic rings, it is preferably aliphatic, e.g., alkylidenyl. The aromatic rings may be further substituted by one or more alkyl, acyl, amino, halo, carboxyl or hydroxy radicals. The quinone structure can be in the leuco form as well as the ketone form. Examplary members are: benzoquinone; 1,4 benzoquinone; anthraquinone; 1,4 diamino anthraquinone; 1,5 diamino anthraquinone; 1-amino 4-hydroxy anthraquinone; 3,5,3',5' tetra (t-butyl) stilbene quinone; 2,5 cyclohexadiene 1,4 diimine.

A principal advantage is using the quinone and quinoneimine in the form of their compounds rather than in the form of precursors is to substantially reduce the total concentration of such compounds in the final impact resin polymer. Although the quinone and quinone-imines may be highly colored, the polymer product does not exhibit this coloration unless excessive concentrations are used.

The quinones and quinone-imines are formed in situ under the conditions of my process during the polymerization from hydroxy aromatic and amino-aromatic compounds that are present as antioxidants in the raw materials; principal sources are the styrene monomer, the polybutadiene rubber and the plasticizer. The hydroxy aromatic compounds may also contain more than one hydroxy, as well as carboxyl, carbonyl, nitro, amino, aminoalkyl, alkylamino, alkyl, alkenyl, alkoxy and alkacyl groups. The hydroxy aromatic precursor may be selected from:

2,6-di (tert butyl)-4-methyl phenol (butylated hydroxy toluene)
2,6-di (tert butyl)-4-ethyl phenol
parahydroxybenzaldehyde
hydroquinone monomethyl ether
p-amino phenol
2,6-diisopropyl phenol
3,5-ditertiarybutyl-4-hydroxy benzyl ether
1,3,5-trimethyl-2,4,6-tris(3,5-ditertiarybutyl-4 hydroxy benzyl) benzene
2,6-dioctadecyl-paracresol
2 tertiary butyl hydroxy anisole
4-hydroxymethyl-2,6-ditertiarybutyl phenol
4-tertiary-butyl pyrocatechol
2,5-ditertiaryamyl hydroquinone
2,2,'-ethylenebis (4-methyl-6-tertiarybutyl phenol)
4,4'-methylenebis (6-tertiarybutyl-ortho-cresol)
4,4'-methylenebis (2,6-ditertiarybutyl phenol)

The amino aromatic compound is preferably a substituted phenylene diamine. Exemplary compounds are:

N,N'-Bis(1,4-dimethylpentyl)-p-phenylenediamine
N,N'-Bis(1-ethyl-3-methylpentyl)-p-phenylenediamine
N,N'-Bis(1-methylheptyl)-p-phenylenediamine
N-sec-Butyl-N'-phenyl-p-phenylenediamine
N-Cyclohexyl-N'-phenyl-p-phenylenediamine
Diarylarylenediamines, mixed
Diaryl-p-phenylenediamine
N,N(-Dicyclohexyl-p-phenylenediamine
N-(1,3-Dimethylbutyl)-N'-phenyl-p-phenylenediamine
N,N'-Di-2-naphthyl-p-phenylenediamine
N,N'-Diphenyl-p-phenylenediamine
N-Isopropyl-N'-phenyl-p-phenylenediamine
N-(1-methylpentyl)-N'-phenyl-p-phenylenediamine
N-Phenyl-N'-2-octyl-p-phenylenediamine Many of these hydroxy aromatics will tend to dimerize during heating for polymerization. The intermediate dimer in turn reacts to form the quinone. For example, in the case of the 2,6-di(tertbutyl)-4-methyl phenol, about 1% to about 10% will convert to the dimer and about 1% to about 10% of the dimer will form the quinone. The aromatic amines can be converted to quinone imines. Typically the total aromatic hydroxy compounds will be present in amounts of about 2500 ppm in the polybutadiene rubber and about 25 ppm in the styrene and plasticizer. Aromatic diamines will be present in amounts of about 100 ppm of the polybutadiene rubber. Thus during polymerization, both the aromatic hydroxy compound and the aromatic diamines are present together.

The styrene monomer will normally contain inhibitors to prevent autopolymerization during storage; the amount and type may vary. Para t-butyl catchecol at 10–15 ppm of styrene has been found satisfactory. Excess inhibitor tends to give a yellow coloration to the resin product, which desirably will be white.

The polybutadiene rubber may be formed by polymerization of butadiene with complexed organo lithium catalysts in the presence of promoters and hydrocarbon solvents. Typically, complexed butyl lithium compounds are used for the polymerizations which yield a polybutadiene rubber having 11 to 22% vinyl content. Conditions for polymerizations of this type are described by Advances in Chemistry Series 130, Chapter 7. These rubbers are available in a variety of viscosities; usually, the viscosity range will be about 80 to about 200 centistokes for 5% styrene solutions measured at 25° C. The corresponding number average molecular weights are in the range of 60,000 to 110,000. The polymerized butadiene is in the form of isomeric cis, trans and vinyl structures. The preferred method of analysis for the percentage by weight of vinyl in the total cis, trans and vinyl structures is 220 MHz NMR. The concentration of cis isomer should be in the range of 30–45% and the trans isomer should be in the range of 40–60%; the trans concentration should also be such that it is the result of X-(% vinyl+% cis), where X is the total concentration of cis, trans and vinyl isomer units (generally X is considered equal to 100).

While the aforesaid polybutadiene rubber will usually be the sole rubbery material used in the polymerization with styrene, in some instances it is useful to have other rubbers as well. For example, polybutadiene rubbers conventionally used for making impact polystyrene resins (see U.S. Pat. No. 3,868,434 and U.S. Pat. No. 3,929,936), having about 7 to 10% vinyl content and about 35% cis content can be used in up to 50% by weight of the total rubbers present where it is desired to have an impact polystyrene resin with greater melt flow and less melt toughness. Likewise, minor amounts of styrene-butadiene block copolymer rubbers can be present to impart increased glossiness to the impact polystyrene resins without substantial loss of chemical resistance.

Phenols and phenylene diamines are antioxidants which may be added to rubber to provide protection against oxidation. While the mechanism of this protection is not completely elucidated for all phenols and phenylene diamines, there is evidence that the first step of this protection involves the abstraction of hydrogen from the antioxidant which then undergoes further reaction. Oxygen or free radicals can initiate the hydrogen abstraction. The ultimate product after hydrogen abstraction from several of the outstanding rubber antioxidants is a quinone or an imine. The products formed from BHT have been identified. The steps leading to the quinone final product are shown below as described in J. Am. Oil Chem. Soc. 51, 404–406 (1974).

Butylated hydroxy toluene (BHT) 4-methyl-2,6-di(tert-butyl)-phenol

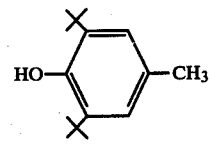

3,3',5,5'-tetra-bis(tert-butyl)-4,4'-dihydroxy-1,2-diphenylethane (BHT Dimer)

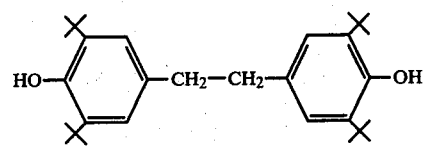

3,3',5,5'-tetra-bis-(tert-butyl)stilbene quinone

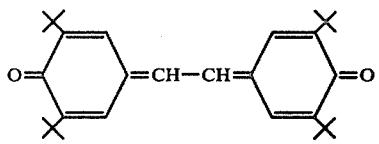

These final product quinones and imines are strong free radical traps which convert active free radicals to inactive free radicals. BHT does not markedly slow polymerization initially. However, as BHT is converted to quinone, this product becomes available to absorb active free radicals toward the end of polymerization.

In any event, whether the quinones and quionone-imines are added separately or are formed in situ, they should be members of the group:

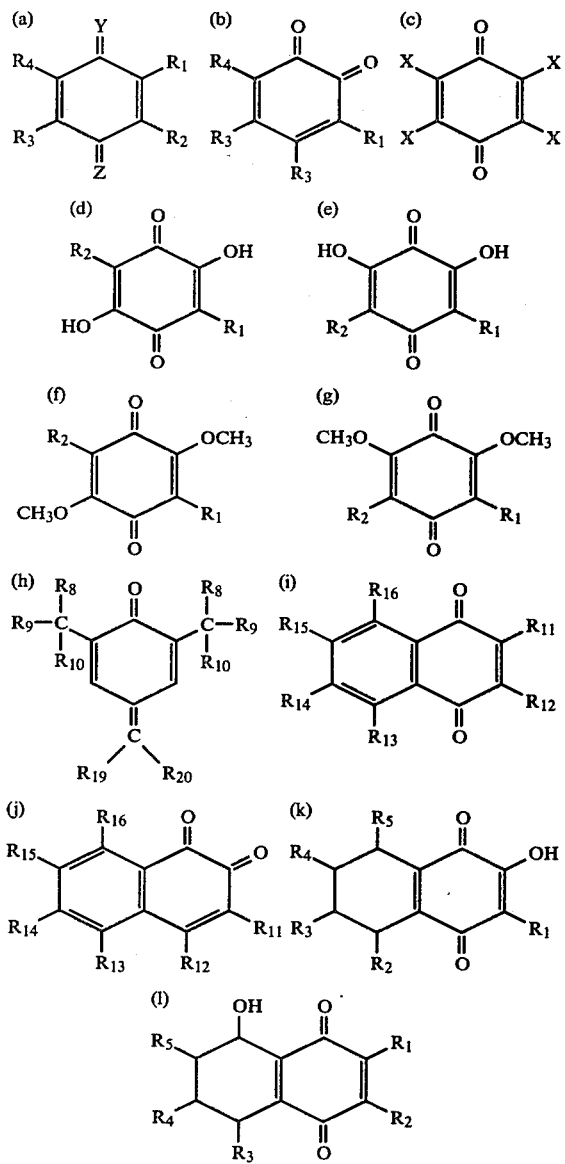

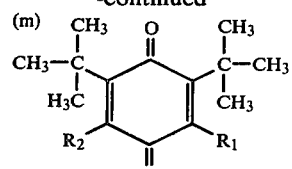

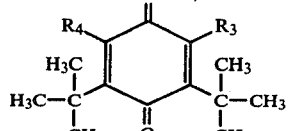

where X is Cl or Br, Y is O or $NR_1$, Z is O, $NR_1$ or

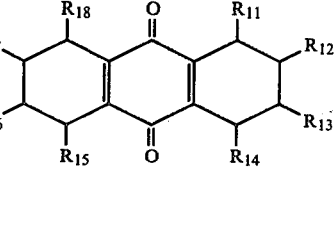

$R_1$, $R_2$, $R_3$, $R_4$ and $R_5$ are independently selected from hydrogen, branched or straight chain alkyl or alkylidene moieties having from one to 18 carbon atoms, phenyl and lower alkyl substituted phenyl moieties having up to 10 carbon atoms, and cyclic hydrocarbon moieties having from 3 to 6 carbon atoms in the cyclic ring, $R_6$ and $R_7$ are independently selected from hydrogen, branched or straight chain alkyl moieties having from 1 to 17 carbon atoms, phenyl or lower alkyl substituted phenyl moieties having up to 10 carbon atoms and cyclic hydrocarbon moieties having from 3 to 6 carbon atoms in the cyclic ring, $R_8$, $R_9$ and $R_{10}$ are independently selected from hydrogen, straight or branched chain alkyl moieties having from 1 to 8 carbon atoms, phenyl and lower alkyl substituted phenyl moieties having up to 10 carbon atoms, and cyclic hydrocarbon moieties having from 3 to 5 carbon atoms including cyclic polymethylene groups wherein any two of $R_8$, $R_9$ and $R_{10}$ are members of the same cyclic hydrocarbon moiety, $R_{11}$, $R_{12}$, $R_{13}$, $R_{14}$, $R_{15}$, $R_{16}$, $R_{17}$ and $R_{18}$ are independently selected from $R_1$, $NHCH_3$, $NH_2$, $N(CH_3)_2$, OH, $OCH_3$, $NHCOCH_3$, $OCOCH_3$, X, $SO_3H$ or its salts, $SO_2C_2H_4CH_3$, $NHC_6H_5$ and $R_1$ substituted with one or more of $NHCH_3$, $NH_2$, $H(CH_3)_2$, OH, $OCH_3$, $NHCOCH_3$, $OCOCH_3$, X, $SO_3H$ or a salt thereof, $SO_2C_2H_4CH_3$, and $NHC_6H_5$, and $R_{19}$ and $R_{20}$ are independently selected from $R_8$ and $R_9$ wherein the cyclic hydrocarbon moieties may have 3 to 5 carbon atoms and include $R_{19}$ and $R_{20}$ in the same cycle ring.

When styrene is polymerized with rubber thermally with the temperature below 230° F., very little grafting occurs and the rubber is not cross-linked. If the temperature is raised however, cross-linking of rubber may occur. The first step in polymerization of styrene with rubber under thermal conditions is conducted to accomplish "phase inversion" of the rubber. The polymerization of styrene withdraws styrene which has solubilized rubber and the rubber comes out of solution. With the proper amount of shear agitation the particles of rubber are controlled in size. They usually entrap some styrene and polystyrene as occlusions within each rubber particle as it is formed by rubber separation. This step however must be done with the temperature in all parts of the reactor maintained below 250° F. to avoid formation of gels by premature cross-linking of the rubber.

After the rubber has separated, catalyst is added and the particles of rubber (containing occlusions) in the styrenepolystyrene solution are suspended. The catalyst is selected to complete the polymerization of styrene and to cause the rubber particles to graft with styrene. Cross-linking of the rubber particles also begins to occur with catalyst present and continues as the temperature is raised. The temperature is held below 270° F. to prevent too extensive cross-linking of the rubber. The small amounts of quinones and/or quinone imines formed played a key role in keeping the cross-linking from becoming too extensive through their action as free radical traps during the later stages of polymerization. The combination of quinone formation with a limitation on the temperature employed in polymerization acts to hold the cross-linking of the 11–22% vinyl rubber particles within the desired limits of swelling index of 5.0 to 30.0. While the quinones and/or quinone imines may be derived from action of the polymerization on the precursor phenolic antioxidants and/or phenylene diamines, they also may be added separately to the polymerization. They can be added anytime after onset of polymerization and may be added toward the latter stages of polymerization to control rubber cross-linking. It is not desirable to add these quinones or quinone imines before the onset of polymerization since they are such effective free radical traps that it is difficult to start the polymerization in their presence. They are best added to a polymerization in progress.

In operation of the process it may be desirable to continuously feed the small quantity of quinone or quinone diimine rather than add the quinone all at once. The continuous procedure is preferable when the polymerization is slow and susceptible to complete inhibition if too large an amount of quinone is added at one time. As compared to the use of precursor phenolic antioxidants and phenylene diamines, the quinones and quinone imines are effective in such small quantities that 100 fold to 1000 fold smaller quantities may be added. Although the quinones and/or quinone imines are highly colored compounds, the products formed from their addition to a polymerization in progress is very slightly colored and may be less colored than a polymer containing the 1000 ppm level of phenolic antioxidant or the 100 ppm level of phenylene diamine. The amount of catalyst added and the temperature to which the polymerization is taken determines the exact amount of quinone and/or quinone imine needed. The most useful range is from 0.1 to 10 ppm quinone and/or quinone imine in combination with a temperature below 270° F. and a catalyst amount less than $5.8 \times 10^{-4}$ moles/mole styrene. The catalyst should have a half life of about ½-hour to about 10 hours at 235°–250° F. measured in benzene or chlorobenzene.

It is believed that the phosphite in combination with the BHT impairs the production of intermediate products of BHT and prevents the formation of effective amounts of quinone from the BHT. Thus it is undesirable to use the phenolic antioxidant precursors with hydrogen donating synergistic antioxidants such as the phosphites unless one is using a low vinyl level rubber which requires more favorable cross-linking conditions to obtain the desired cross-linking as indicated by the swelling index.

Typical phenolic antioxidants and phenylene diamines, yielding quinones and quinone imines are illustrated.

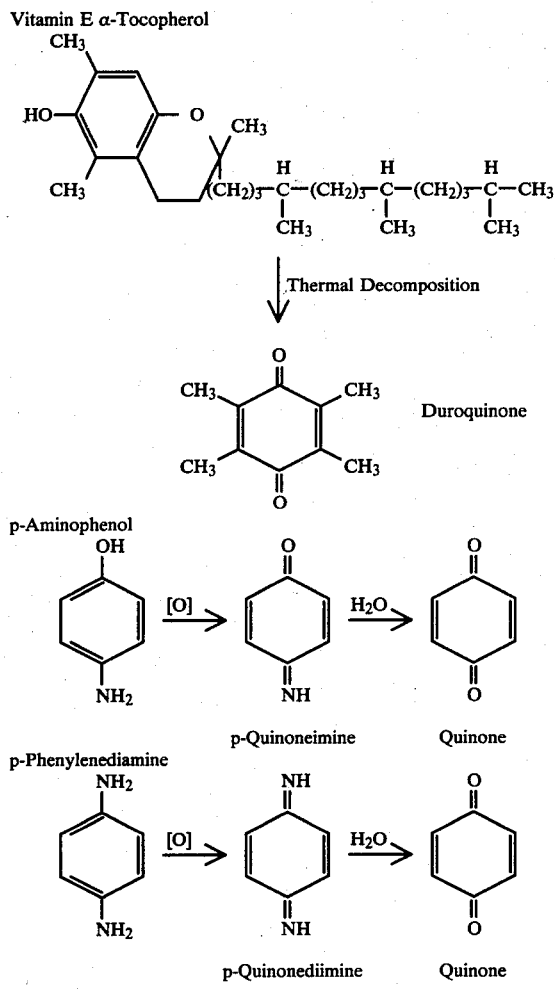

Typical quinone and quinone imines which may act as free-radical traps are illustrated and named below.

2,5-cyclohexadiene-1,4-diimine

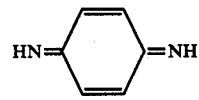

p-Diphemoquinone

o-Benzophenone

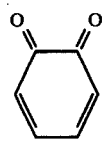

-continued

Quinone

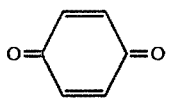

β-Naphthaquinone

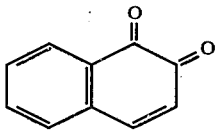

α-Naphthaquinone

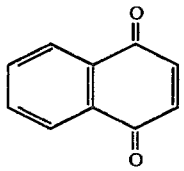

Anthraquinone

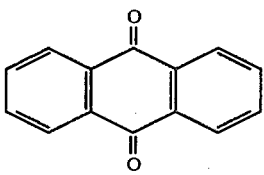

2,5-Dimethoxy-1,4-Benzoquinone

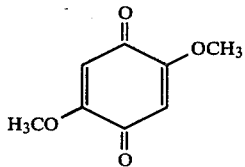

2,3-Dimethyl-1,4-Naphthaquinone

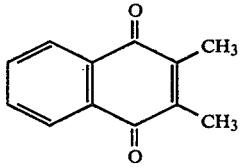

2,6-Dimethoxy Benzoquinone

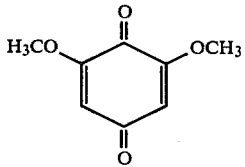

Embelin

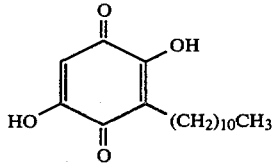

Juglone

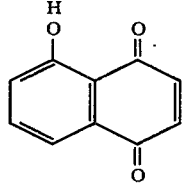

Isolapachol

-continued

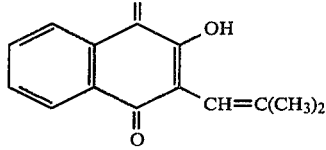

N-Methyl Quinone Monoimine

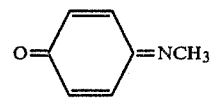

N-Methyl Quinone Diimine

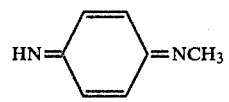

N,N'-Dimethyl Quinone Diimine

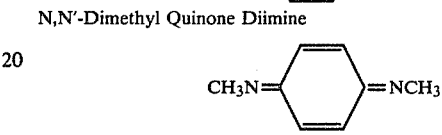

Phenyl Quinone Monoimine

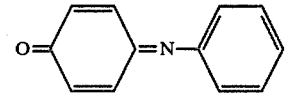

Phenyl Quinone Diimine

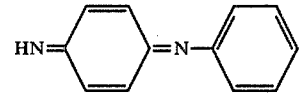

High boiling plasticizers are incorporated into the impact polystyrene resin. These improve flowability of the resin and also improve elongation at yield. The plasticizer will be an inert organic compound and will have an initial boiling point in the range of 500° F. Preferably, it will have no substantial volatilization below 600° F. The viscosity will be in the range of 300–440 SSU at 100° F. Typical members are alicyclic and paraffinic hydrocarbon oils, alicyclic and aliphatic esters of long chain fatty acids, e.g., butyl stearate; low molecular weight olefin polymers, e.g., polyethylene oils, polybutylene oils, and poly (ethylene alkyl acrylate) copolymer oils. These are generally used in amounts of 0.5 to 2% by weight of the impact polystyrene resin. A hydrocarbon oil that has been found effective is composed of about 20–50% napthenic carbon atoms and about 70–50% paraffinic carbons with less than 10% aromatic carbons; it has a viscosity of 335 SSU at 100° F. Such oils are usually stabilized with around 10 ppm vitamin E (a-tocopherol) or with 10 ppm BHT.

The initial thermal polymerization of the styrene and polybutadiene rubber is conducted at temperatures from about 220° F. up to about 250° F. During this polymerization, the initial solution of styrene and rubber undergoes a phase inversion by which the styrene-polystyrene material becomes the continuous phase with small droplets of styrene-rubber phase material as the dispersed phase. Agitation during this stage of polymerization affects the size of the dispersed insoluble particles in the final resin. This size is controlled to give the optimum gloss and impact strength; weight average particle sizes of 2 to 6 microns are particularly desirable. The thermal polymerization proceeds principally by the formation of secondary free radicals rather than primary free radicals.

Once the polymerization reaches a viscosity of about 3,000 centipoises, the system can be suspended in water with the use of suspension agents. This region will generally permit the polymerization to be conducted without excessive risks of premature gelation and blockage of the reactors. Calcium phosphate in combination with an alkali metal salt of an alcohol ester sulfate is typical of such suspension agents. The polymerization is continued in suspension by the addition of free radical catalysts with half-lives of about ½ to about 10 hours at 235°–250° F. The polymerization in the suspension polymerization after catalyst addition is continued at temperatures of up to about 270° F. until the residual monomer level is less than 0.3% by weight of resin. An advantage of the polymerization with the aqueous suspension is that the polymerizing mixture is in the form of small droplets surrounded by water as a heat transfer medium. The viscosity of the suspension remains essentially constant while it is agitated during this latter stage of polymerization. This is especially desirable for the polymerization of styrene with the polybutadienes having 11–22% vinyl because very high viscosities in the polymerizing styrene-rubber mass arise as polymerization exceeds 30% conversion of styrene. The addition of the oil soluble organic peroxide catalysts to the suspension promotes graft polymerization to go to completion. Catalyst addition at this time has the further benefit that the presence of the water phase permits the viscosity of the dispersed droplets of rubber-polystyrene-styrene to be increased substantially while the total mass is agitated with little viscosity change. The continuous water phase surrounds the dispersed organic phase and permits agitation at relatively low viscosity.

A mercaptan or other type chain regulator is preferably added to the rubber being dissolved in the styrene to control the molecular weight of the impact polystyrene to a melt flow range suitable for extrusion or extrusion and injection molding use. The presence of the chain regulator from the time of rubber dissolving onward helps prevent the formation of gels in the impact polystyrene. The inhibitors present in the rubber alone will not prevent such gel formation. These inhibitors act chiefly to control the extent of cross-linking of the rubber particles so that high impact polystyrene with good elongation can be obtained. Without the inhibitors present the impact polystyrene does not have appreciable elongation before breaking in tension.

However, the inhibitors selected must not function to markedly slow the free radical polymerization or the cycle times for polymerization will be unduly extended. The temperature ranges employed are critical for obtaining good impact values in the polystyrenes. Prolonged temperature well above 270° F. are undesirable. However, the impact polystyrene formed will withstand the short residence time (around 1 minute) required for extrusion at 360°–500° F. The resins are capable of withstanding repeated extrusions with little change in physical properties. Up to 1500 ppm. of butylated hydroxy phenol or other antioxidants by weight of polystyrene may be added after the polymerization is complete to ensure protection against changes during reextrusion. However, the impact polystyrene is remarkably stable even without the supplemental addition of inhibitor or antioxidant after polymerization is completed. The inhibitors present in the rubber, styrene and plasticizer provide considerable protection to the polymer.

EXAMPLES

A rubber solution in styrene was made by dissolving six parts of polybutadiene in 100 parts of styrene monomer containing the desired level of t-dodecyl mercaptan chain regulator. The solution was stirred and thermal polyermization in the mass was conducted at 250° F. (121° C.) until approximately 30% conversion. The inhibitor content in the rubber is shown in Table IV. Table IV lists rubber inhibitor levels on the rubbers supplied for these experimental runs.

Table V lists rubber inhibitors and their levels (C-1 through C-7) which would yield similar results by the teachings of this application to those of A-1 through A-7. Additional combinations further illustrating possible combined inhibitors are shown in D-1 and D-2.

Following thermal polymerization to about 30% conversion, a high boiling mineral oil plasticizer is added. This oil desirably has an initial boiling point of at least 600° F., a viscosity of about 350 SSU and at least about 20% naphthenic hydrocarbons. It also contains a small amount of an oxidation inhibitor, a-tocopherol. Thereafter, the polymerizing mixture is suspended in water with a suspension system of calcium phosphate and a sodium salt of an alcohol sulfate as a surfactant. A t-butyl perbenzoate peroxide catalyst is added and the polymerization is continued at 230° F. (110° C.) while the suspension is stirred. Toward the end of polymerization, the temperature is increased to 270° F. (132° C.) until polymerization is complete, e.g., 0.3% or less of residual volatiles. The polymerization is conducted under an inert nitrogen atmosphere.

Fine beads of polymer are recovered from the suspension. These beads are washed with mineral acid to remove calcium phosphate and washed with diminer-alyzed water to remove the mineral acid. The resulting beads are hot air dried before extrusion. An antioxidant such as BHT (butylated hydroxy toluene) is frequently added to the dry beads at levels of 1,000 ppm by weight of polystyrene before extrusion and underwater die face cutting into pellets. The dry pellets are then suitable for injection molding or extrusion into thin sheets. However, the critical aspects of this process are the inhibitors present in the rubber during polymerization and the temperatures to which the rubber is subjected during polymerization in the presence of a free radical catalyst since these factors control the extent of cross-linking of the rubber phase in impact polystyrene. The elongation of impact polystyrene in sheet form and in thermoformed items from the sheet is affected by the choice of rubber inhibitors and the temperature used to complete the free radical polymerization.

The polystyrene resin composition may also contain processing additives and stabilizers, e.g., stearic acid, to adjust the physical properties of the resin product.

In the following Table I, the products shown as "A" are formulated to give a resin product particularly for extrusion application; it has a low gloss finish. The products shown as "B" are formulated to give a resin product that can be used for both extrusion and injection molding applications; it has a high gloss finish.

Resin A used a polybutadiene rubber having an ML-4 viscosity of 55; Resin B used a polybutadiene rubber having an ML-4 viscosity of 35.

The microstructure of the rubber is reported as "% vinyl", percent vinyl. This is the content of 1,2 addition forms by weight in the total butadiene steroisomer content of the polybutadiene rubber. This has been determined by 200 MHz NMR studies of the rubbers used in the Examples. Other analytical techniques can be used if values so obtained are adjusted to compensate for changes in instrumentation and procedure.

Analysis of the impact polystyrene resins produced in accordance with the Examples are described in the following Tables I, II and III. The designations MD and AMD mean "machine direction" and "across machine direction".

Table I

| | | | | Resin Series A 5.66% Rubber | | | | |
|---|---|---|---|---|---|---|---|---|
| Resin | Vinyl | Flow Rate g/10 Min. | Viscat % F | Tensile @Yield psi | Tensile @ Failure psi | Elongation @ Failure % | Izod Impact, Ft-Lb/In. Room Temp., Notched .125 Thick Samples | RPS Microns Wgt. Avg. | Swelling Index Dry Weights |
| A-1 | 11.7 | 2.6 | 216 | B-4580<br>P-4480<br>$^S$MD-3590<br>AMD-3730 | B-4390<br>P-4345<br>$^S$MD-3090<br>AMD-2830 | B-47<br>P-52<br>$^S$MD-55<br>AMD-35 | B-2.6<br>P-2.5<br>$^S$MD-1.6<br>AMD-1.6 | 3.8 | |
| A-2 | 11.7 | 2.3 | 217 | B-4420<br>P-4480<br>$^S$MD-3450<br>AMD-3600 | B-4400<br>P-4422<br>$^S$MD-3130<br>AMD-3090 | B-59<br>P-52<br>$^S$MD-50<br>AMD-49 | B-2.7<br>P-2.5<br>$^S$MD-1.7<br>AMD-1.6 | 5.1 | |
| A-3 | 12.8 | 3.2 | 215 | P-4400<br>$^S$MD-3420<br>AMD-3460 | P-4400<br>$^S$MD-3240<br>AMD-3140 | P-49<br>$^S$MD-52<br>AMD-54 | P-2.2<br>$^S$MD-1.6<br>AMD-1.5 | | |
| A-4 | 17.1 | 2.6 | 215 | P-4636<br>$^S$MD-3820<br>AMD-3900 | P-4520<br>$^S$MD-3320<br>AMD-3220 | P-50<br>$^S$MD-48<br>AMD-44 | P-2.2<br>$^S$MD-1.5<br>AMD-1.5 | | |
| A-5 | 17.1 | 2.4 | 214 | P-4640<br>$^S$MD-3830<br>AMD-3850 | P-4420<br>$^S$MD-323-<br>AMD-3170 | P-47<br>$^S$MD-45<br>AMD-50 | P-2.4<br>$^S$MD-1.6<br>AMD-1.6 | | |
| Replicate Tests of A-5 | | | | | | P-50<br>$^S$MD-49<br>AMD-45 | P-2.5<br>$^S$MD-1.4<br>AMD-1.3 | | |
| A-6 | 20.6 | 1.8 | 216 | P-5100<br>$^S$MD-3370<br>AMD-3390 | P-4700<br>$^S$MD-4190<br>AMD-4190 | P-37<br>$^S$MD-39<br>AMD-45 | P-3.0<br>$^S$MD-1.4<br>AMD-1.3 | | |
| A-7 | 20.6 | 2.5 | 218 | P-4700<br>$^S$MD-3870<br>AMD-3960 | P-4520<br>$^S$MD-3210<br>AMD-3180 | P-53<br>$^S$MD-40<br>AMD-39 | P-2.2<br>$^S$MD-1.6<br>AMD-1.6 | 3.0 | 14.3 |
| A-8 | 9.6 | 2.8 | 214 | P-4412<br>$^S$MD-3633<br>AMD-3720 | P-4308<br>$^S$MD-3080<br>AMD-3110 | P-47<br>$^S$MD-45<br>AMD-51 | P-2.2<br>$^S$MD-1.6<br>AMD-1.6 | 3.7 | 21 |

Table II

Recycled Materials
Resin Series A, Re-Extruded Sheets

| Resin | Physical Property | | 1st Recycle | 2nd Recycle | 3rd Recycle | 4th Recycle |
|---|---|---|---|---|---|---|
| | Tensile @ | MD | 3430 | 3480 | 3370 | 3430 |
| | Yeild | AMD | 3490 | 3590 | 3460 | 3550 |
| | Tensile @ | MD | 3200 | 3280 | 3120 | 3230 |
| A-3 | Failure | AMD | 3130 | 3250 | 3060 | 3270 |
| 12.8% Vinyl | Elongation @ | MD | 47 | 49 | 45 | 45 |
| | Failure | AMD | 50 | 55 | 43 | 51 |
| | Izod | MD | 1.5 | 1.5 | 1.6 | 1.6 |
| | Impact | AMD | 1.4 | 1.4 | 1.5 | 1.5 |
| | Tensile @ | MD | 3420 | 3400 | 3410 | 3510 |
| | Yield | AMD | 3420 | 3440 | 3550 | 3520 |
| | Tensile @ | MD | 4240 | 4200 | 4240 | 4230 |
| A-6 | Failure | AMD | 4300 | 4310 | 4340 | 4280 |
| 20.6% Vinyl | Elongation @ | MD | 41 | 41 | 40 | 41 |
| | Failure | AMD | 43 | 41 | 47 | 45 |
| | Izod | MD | 1.5 | 1.4 | 1.4 | 1.4 |
| | Impact | AMD | 1.2 | 1.1 | 1.0 | 1.1 |
| | Tensile @ | MD | 3600 | 3700 | 3600 | 3700 |
| | Yield | AMD | 3700 | 3700 | 3800 | 3800 |
| | Tensile @ | MD | 3200 | 3300 | 3200 | 3300 |
| A-8 | Failure | AMD | 3200 | 3200 | 3200 | 3300 |
| 9.6% Vinyl | Elongation @ | MD | 57 | 55 | 48 | 51 |
| | Failure | AMD | 55 | 58 | 56 | 56 |
| | Izod | MD | 1.6 | 1.5 | 1.5 | 1.5 |
| | Impact | AMD | 1.5 | 1.5 | 1.5 | 1.5 |

Table III

| Resin | % Vinyl | Flow Rate | Viscat °F. | Tensile Tensile @ Yield | Resin Series B 5.44% Rubber Tensile @ Yield | Elongation @ Failure | Izod Impact Room Temp., Notched .125 Thick Samples | RPS Wgt. Avg. | Swelling Index Dry Weights |
|---|---|---|---|---|---|---|---|---|---|
| B-1 | 9.6 | 2.5 | 216 |  | P-4740<br>SMD-4620<br>AMD-4210 | B-27<br>B-34<br>SMD-2<br>AMD-2 | B- .9<br>P- .8<br>SMD- .7<br>AMD- .6 | 1.0 |  |
| B-2 | 9.6 | 3.8 |  |  | P-4360<br>SMD-3392<br>AMD-3456 | B-41<br>P-49<br>SMD-52<br>AMD-58 | B-1.3<br>P-2.0<br>SMD-1.0<br>AMD-1.0 | (1.7–3.0) | 19–22 |
| B-3 | 7.9 | 3.3 | 216 | P-4740<br>SMD-3880<br>AMD-4020 | P-4140<br>SMD-2970<br>AMD-2960 | P-38<br>SMD-45<br>AMD-41 | P-2.5<br>SMD-1.8<br>AMD-1.9 | 2.5 | 22.1 |
| B-4 | 12.0 | 3.5 | 218 | P-5200<br>SMD-4780<br>AMD-4810 | P-4320<br>SMD-3370<br>AMD-3810 | P-39<br>SMD-20<br>AMD-6 | P-1.3<br>SMD-1.1<br>AMD-1.0 | 3.0 | 15.5 |
| B-5 | 14.3 | 4.0 | 215 | P-5380<br>SMD-4910<br>AMD-5040 | P-4440<br>SMD-3450<br>AMD-4010 | P-38<br>SMD-15<br>AMD-7 | P-1.3<br>SMD-1.1<br>AMD-1.0 | 1.0 | 14.4 |

Table IV

| Run | Description | % Vinyl | Rubber Inhibitors Present X* | Y** | Z*** |
|---|---|---|---|---|---|
| A-1 | (see Table I) | 11.7 | 1800 | 200 | — |
| A-2 | " | 11.7 | 1800 | 200 | — |
| A-3 | " | 12.8 | 1800 | 200 | — |
| A-4 | " | 17.1 | 1800 | 200 | — |
| A-5 | " | 17.1 | 1800 | 200 | — |
| A-6 | " | 20.6 | 1800 | 200 | — |
| A-7 | " | 20.6 | 1800 | 200 | — |
| A-8 | Control (Prior Art Rubber) | 9.6 | 1800 | 200 | — |
| B-1 | (see Table III) | 9.6 | 0 | 0 | — |
| B-2 | " | 9.6 | 1800 | 200 | — |
| B-3 | " | 7.9 | 2000 | — | 2000 |
| B-4 | " | 12.0 | 2000 | — | 2000 |
| B-5 | " | 14.3 | 2000 | — | 2000 |

\* = BHT expressed as ppm on rubber.
\*\* = Substituted Phenylene Diamine expressed as ppm on rubber.
\*\*\* = Polygard expressed as ppm on rubber.

Table V

| Run | % Quinone | Rubber Inhibitors Present Stilbene Imine | Substituted Quinone |
|---|---|---|---|
| C-1 | 11.7 | 2 ppm | 2 ppm |
| C-2 | 11.7 | 2 ppm | 2 ppm |
| C-3 | 12.8 | 2 ppm | 2 ppm |
| C-4 | 17.1 | 2 ppm | 2 ppm |
| C-5 | 17.1 | 2 ppm | 2 ppm |
| C-6 | 20.6 | 2 ppm | 2 ppm |
| C-7 | 20.6 | 2 ppm | 2 ppm |
|  |  | BHT Dimer |  |
| D-1 | 11.7 | 50 ppm | 2 ppm |
|  |  | Stilbene Quinone | γ |
| D-2 | 11.7 | 5 ppm | 100 ppm |

The physical properties measured on samples taken from bead (B), pellet (P) or sheet (S) forms of the resins are shown in Tables I and III. The sheet materials are 0.125 inches thick. This data also shows the influence of melt processing of resins on the measured physical properties. Table II illustrates the effect from repeated repelletization of the resin materials and extrusion into sheet form; this simulates the recycling of resin materials trimmed from fabricated items which may typically be used in amounts up to 50% by weight of the total resin being processed.

The particle size of the dispersed insoluble particle phase in the impact polystyrene resin in the Examples is within the range of 1.0–6.0 microns. Preferably it is within the range of 1.5 to 4.0 microns. For a given resin formulation, the particle size attained is selected for an optimum balance between gloss and impact strength under the particle polymerization conditions and agitation conditions employed. The Swelling Index measured to dry weights is in the range of 5 to 25. Even if the resin particle size and Swelling Index are as described above, as illustrated in Tables I and III, the impact strength, elongation and tensile strengths of impact polystyrene resin compositions can be very poor unless the principles of this invention are followed.

In the examples A-1 to A-7, the polybutadiene rubber had about 0.18% by weight of butylated hydroxy toluene and a small amount of substituted para-phenylene diamine as stabilizers. A-8 represents a typical impact polystyrene resin made from a polybutadiene rubber in which the vinyl content is 9.6%. As shown, the range of melt indices is given as Flow rate and is satisfactory for use of these resins in extrusion. The Izod impact, Elongation at Failure and Tensile strength at Failure for A-1 to A-7 illustrate that the resins made from the corresponding rubbers have achieved an effective modification of the polymerized styrene matrix with small insoluble particles and that the overall general physical properties are at least as good as the resin of A-8. The extruded sheets were smooth and had good uniformity in thickness (gage control). The change in physical properties between bead, pellet and sheet samples is consistent. The isotropic nature of the sheet materials is shown by the MD (sample in direction of extrusion) and AMD (sample perpendicular to direction of extrusion) values. The difference between these values is less than 15% for both Izod impact strength and Elongation at Failure. Tensile strength at Break also comes within this range. The Tensile strengths at Yield reflect the initial deformation of the resin sample and occur at elongations on the order of 2%. The combination of tensile strength at Yield and Failure and Elongation at Failure demonstrates effective and efficient modification of the polymerized styrene matrix. Particularly, the physical properties of the samples from extruded sheets, show that the resins of my invention can be used for extrusion fabrication. The resistance to insoluble particle breakdown during melt processing is considered to arise from the relatively higher vinyl content in the polybutadiene rubber used in the polymerization for forming the impact resins. Resins A-6 and A-7 show the start of significant changes in lowering Izod impact strength and elongation at failure and corresponding increasing tensile strengths that would give unsatisfactory products. Because of the rubber used in A-6 and A-7 had 20.6% vinyl, and from the counterpart effects noted from Table III, it is seen that the upper limit for vinyl content to achieve satisfactory resins is with a polybutadiene rubber having about 22% vinyl content.

In Table II, the stability on melt processing is illustrated from the properties of recycled resin from sheet samples. The resin types are those of A-3, A-6 and A-8 of Table I. Extruded sheet was melted and re-extruded four successive times. The Tensile strength, elongation and Izod impact strength after each extrusion run was measured. The physical properties are remarkably constant between the successive extruded samples including the isotropic properties of the sheets. Resin A-6 shows the beginning of lowering of Izod impact strengths which arise from reaching the maximum useful vinyl content in the polybutadiene rubbers. This stability of the resins shows the adequacy of stabilization of the resin compositions against shear and heat degradation.

In Table III, Resins B-1 through B-5 show the effect of the vinyl content of the rubber and the stabilization additives on the resin properties under the polymerization conditions used for the resins in Table I. In resin B-1, the polybutadiene rubber had no stabilizer or antioxidants. There is a substantial loss in Izod impact strength, a substantial loss in elongation at failure (particularly acute in the samples from sheet), a large and persistent increase in tensile strength at yield and a substantial increase in resistance to flow (shown as flow rate). Resin B-2 is a grade for extrusion or injection molding analogous to resin A-8; the polybutadiene rubber contained about 0.18% butylated hydroxy toluene and a small amount of the substituted para-phenylene diamine. Resins B-3 through B-5 were made from a polybutadiene rubber that contained butylated hydroxy toluene and an alkyl aryl phosphite. The flow rate, elongation at failure, tensile strength at break (failure), tensile strength at yield, Izod impact strength and isotropic sheet properties for resins B-2 and B-3 are substantially the same. Resins B-4 and B-5 were made from polybutadiene rubbers having the same additives as those in the rubber used fo resin B-3. The physical properties for resins B-4 and B-5 show substantial losses in Izod impact strength and elongation at yield and also a large increase in Tensile strength. Moreover, the sheet samples show substantial anisotropy. It should be noted that the insoluble particle size range and swelling index for the resins in Table III are all within the normally accepted ranges for conventional impact polystyrene resins. The steep decrease in values of physical properties between the resins B-2 and B-3, and the resins B-1, B-4 and B-5 demonstrate the sensitivity of the resin properties to polymerization conditions and ingredients used along with the polybutadiene rubber and the styrene monomer.

In addition to the foregoing, it has also been observed that the presence of active oil soluble peroxide catalysts in the thermal polymerization state causes resins made under the conditions described above to show extensive graft copolymerization which interferes with the phase inversion and also causes loss of definition of the identity of the dispersed insoluble particles. Furthermore, when substantial temperature variations along reactor side walls exist, those regions having substantially higher temperatures than those used above show the formation of insoluble gel like masses during the thermal polymerization for resins such as those in A-8 and B-2.

The resin compositions of this invention also have utility in the same manner as conventional impact polystyrene resins. These compositions may be blended with crystal polystyrene resins to form medium impact polystyrene resins. Likewise, the resins may be colored with pigments. In addition to deep draw thermoforming and injection molding of thin-walled articles, the resins compositions may be co-extruded with other plastics materials. Foamed resin articles may be made by foaming of molten resin with injection of expansion agents or by foaming particles of the resin composition that contain expansion agents. Auxiliary operations such as trimming, punching or stamping fabricated articles as well as printing, painting or adhesive coating can be performed.

This invention has provided high impact polystyrene resins with outstanding physical properties. These are particularly useful in fabrication of plastic articles by molding or extrusion. While the invention has been described above in terms of specific conditions, examples and materials, it is to be distinctly understood that it may be otherwise variously practiced within the scope of the following claims.

I claim:

1. Method of making a high impact polystyrene composition useful in making extruded sheet having characteristics suited for deep draw thermoforming comprising
   (a) thermally polymerizing while stirring, a polymerization mass comprising styrene, from about 4% to about 8% polybutadiene rubber dissolved therein and having a 1,2 vinyl content of from about 11% to about 22% and a cis content of at least 25%, and about 0.1 ppm to about 10 ppm, based on the weight of the rubber, of a quinone or quinone-imine free-radical terminator, at temperatures from about 235° F. to about 250° F., until about 30% conversion of monomer,
   (b) shearing the mass with agitation or stirring to form a rubber particle size in the range of about 1 to about 10 microns,
   (c) converting the mass to a suspension by the addition of water under agitation,
   (d) adding to said suspension about ½% to about 2% of a high boiling plasticizer,
   (e) further polymerizing the suspension by the addition of an effective amount of free-radical catalyst and maintaining the temperature between about 235° F. to about 270° F., and
   (f) recovering the high impact polystyrene thus formed from the suspension.

2. Method of making a high impact polystyrene composition useful in making a sheet by extrusion, having characteristics suited for deep draw thermoforming comprising (a) polymerizing, while stirring, a polymerization mass comprising styrene and about 4% to about 8% polybutadiene rubber dissolved therein, at least 50% of which polybutadiene rubber has a 1,2 vinyl isomer content of about 11% to about 22% and a cis content of at least 25%, the balance of which has a 1,2 vinyl content of from about 7% to about 10%, at temperatures from about 235° F. to about 250° F., (b) adding to said polymerization mass from about 0.1 ppm to about 10 ppm, based on the weight of the rubber, of a quinone or quinone-imine free-radical terminator, (c) shearing the mass with agitation or stirring to form a rubber particle size in the range of about 1 to about 10 microns, (d) converting the mass to a suspension by the addition of water under agitation, (e) adding to said suspension about ½% to about 2% of a high boiling plasticizer, (f) further polymerizing the suspension by the addition of an effective amount of free-radical catalyst and maintaining the temperature between about 235° F. to about 270° F., and (g) recovering the high impact polystyrene thus formed from the suspension.

3. Method of claim 2 wherein the quinone or quinone-imine free-radical terminator is selected from the group consisting of quinones, quinone alkides, quinone imines, and quinone diimines.

4. Method of claim 2 wherein the quinone or quinone-imine is selected from the group consisting of

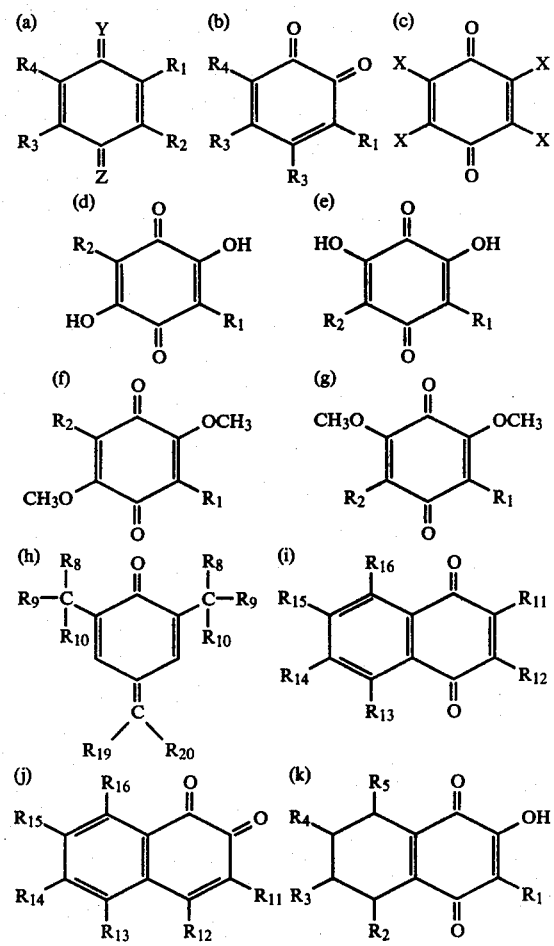

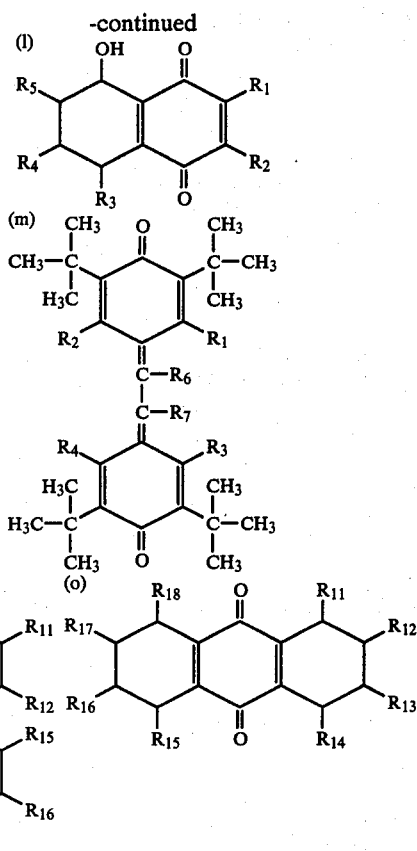

where X is Cl or Br, Y is O or $NR_1$, Z is O, $NR_1$ or

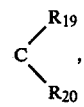

$R_1$, $R_2$, $R_3$, $R_4$ and $R_5$ are independently selected from hydrogen, branched or straight chain alkyl or alkylidene moieties having from one to 18 carbon atoms, phenyl and lower alkyl substituted phenyl moieties having up to 10 carbon atoms, and cyclic hydrocarbon moieties having from 3 to 6 carbon atoms in the cyclic ring, $R_6$ and $R_7$ are independently selected from hydrogen, branched or straight chain alkyl moieties having from 1 to 17 carbon atoms, phenyl or lower alkyl substituted phenyl moieties having up to 10 carbon atoms and cyclic hydrocarbon moieties having from 3 to 6 carbon atoms in the cyclic ring, $R_8$, $R_9$ and $R_{10}$ are independently selected from hydrogen, straight or branched chain alkyl moieties having from 1 to 8 carbon atoms, phenyl and lower alkyl substituted phenyl moieties having up to 10 carbon atoms, and cyclic hydrocarbon moieties having from 3 to 5 carbon atoms including cyclic polymethylene groups wherein any two of $R_8$, $R_9$ and $R_{10}$ are members of the same cyclic hydrocarbon moiety, $R_{11}$, $R_{12}$, $R_{13}$, $R_{14}$, $R_{15}$, $R_{16}$, $R_{17}$ and $R_{18}$ are independently selected from $R_1$, $NHCH_3$, $NH_2$, $N(CH_3)_2$, OH, $OCH_3$, $NHCOCH_3$, $OCOCH_3$, X, $SO_3H$ or its salts, $SO_2C_2H_4CH_3$, $NHC_6H_5$ and $R_1$ substituted with one or more of $NHCH_3$, $NH_2$, $N(CH_3)_2$, OH, $OCH_3$, $NHCOCH_3$, $OCOCH_3$, X, $SO_3H$ or a salt thereof, $SO_2C_2H_4CH_3$, and $NHC_6H_5$, and $R_{19}$ and $R_{20}$ are independently selected from $R_8$ and $R_9$ wherein the cyclic hydrocarbon moieties may have 3 to 5 carbon atoms and include $R_{19}$ and $R_{20}$ in the same cyclic ring.

5. Method of claim 2 wherein the free-radical catalyst has a half-life of from about ½ hour to abut 10 hours and is added in an amount up to about $5.8 \times 10^{-4}$ moles per mole of styrene.

* * * * *

UNITED STATES PATENT AND TRADEMARK OFFICE
CERTIFICATE OF CORRECTION

PATENT NO. : 4,212,789
DATED : July 15, 1980
INVENTOR(S) : Harry D. Anspon

It is certified that error appears in the above-identified patent and that said Letters Patent are hereby corrected as shown below:

Table II, under "Physical Property", change "Yeild" to -- Yield --

Table V, change "Run Vinyl" to -- Run --; change "% Quinone" to -- % Vinyl --; change "Stilbene Imine" to -- Stilbene Quinone --; change "Substituted Quinone" to -- Substituted Quinone Imine --.

Column 18, line 67, after "and" (first occurrence), add -- at --.

Column 21, claim 4, formula (b), change "$R_1$ $R_3$ $R_3$ $R_4$" to -- $R_1$ $R_2$ $R_3$ $R_4$ --.

Signed and Sealed this

Eleventh Day of November 1980

[SEAL]

Attest:

SIDNEY A. DIAMOND

*Attesting Officer*  *Commissioner of Patents and Trademark*